(12) United States Patent
Chen et al.

(10) Patent No.: US 8,270,405 B2
(45) Date of Patent: Sep. 18, 2012

(54) MULTICAST SUPPORT ON A SWITCH FOR PCIE ENDPOINT DEVICES

(75) Inventors: Chih-Cheh Chen, Portland, OR (US); Michael T. Klinglesmith, Portland, OR (US); David M. Lee, Portland, OR (US); John Zulauf, Hillsboro, OR (US); Itay Franko, Folsom, CA (US); Peter J. Elardo, Portland, OR (US); Mohan K. Nair, Portland, OR (US); Christopher Van Beek, Cornelius, OR (US)

(73) Assignee: Intel Corporation, Santa, Clara, CA (US)

( * ) Notice: Subject to any disclaimer, the term of this patent is extended or adjusted under 35 U.S.C. 154(b) by 276 days.

(21) Appl. No.: 12/495,487

(22) Filed: Jun. 30, 2009

(65) Prior Publication Data

US 2010/0329254 A1    Dec. 30, 2010

(51) Int. Cl.
*H04L 12/28* (2006.01)

(52) U.S. Cl. ........................................ 370/390; 370/432

(58) Field of Classification Search ........................ None
See application file for complete search history.

(56) References Cited

U.S. PATENT DOCUMENTS

| 5,305,311 | A  | * | 4/1994  | Lyles .............................. 370/390 |
| 5,940,392 | A  | * | 8/1999  | Lo et al. .......................... 370/392 |
| 7,334,076 | B2 |   | 2/2008  | Hendel et al. |
| 7,760,727 | B2 | * | 7/2010  | Henry et al. ................... 370/390 |
| 2002/0159678 | A1 | * | 10/2002 | Derventzis et al. ............. 385/16 |
| 2004/0177234 | A1 | * | 9/2004  | Kubiczek et al. ............. 712/209 |
| 2006/0209722 | A1 | * | 9/2006  | Takeo et al. .................... 370/254 |
| 2007/0088857 | A1 | * | 4/2007  | Schluessler et al. ............. 710/8 |
| 2008/0002690 | A1 | * | 1/2008  | Ver Steeg et al. ............. 370/390 |
| 2010/0299583 | A1 | * | 11/2010 | Young ........................... 714/795 |
| 2010/0329254 | A1 | * | 12/2010 | Chen et al. .................... 370/390 |

* cited by examiner

*Primary Examiner* — Robert Wilson
(74) *Attorney, Agent, or Firm* — Pillsbury Winthrop Shaw Pittman LLP

(57) ABSTRACT

Devices and method with hardware configured to support phantom register programming. Where phantom register programming allows a device driver for an endpoint device to program multicast registers in the device without support of the operating system.

41 Claims, 10 Drawing Sheets

Phantom Register Support

MULTICAST SUPPORT ON A SWITCH FOR PCIE ENDPOINT DEVICES

RELATED APPLICATION

None.

FIELD

Embodiments of the invention are generally related to multicasting and in particular to multicasting in systems with multiple graphics devices.

BACKGROUND

Peripheral Component Interconnect (PCI) is a second generation parallel bus architecture developed in 1992 as a replacement for the Industry Standard Architecture (ISA) bus. In the PCI standard, all the devices share the same bidirectional, 32-bit (or 64-bit), parallel signal path. The PCI bus brought a number of advantages over the ISA bus, including processor independence, buffered isolation, bus broadcasting, and true plug-and-play operation. PCI Express (PCIe) is a third generation general-purpose serial I/O interconnect designed to replace the PCI bus. Rather than being a bus, PCI Express is structured around point-to-point serial links called lanes.

The point-to-point serial link architecture of PCI Express is well suited for distributed processing via a distributed multi-processor architecture model. Distributed processors are generally optimized to implement data packet processing functions. Unlike general-purpose central processing units (CPUs) that rely heavily on caching for improving performance, distributed processors have a lack of locality in packet processing and need for high-performance I/O that has pushed designers to come up with innovative architectures to reduce processing latency while still processing packets at high data rates.

PCIe has multicast support. Multicasting with PCIe, however, requires multicasting support in either the root ports of the central processing unit (CPU) or in the system endpoints. Additionally, multicasting with PCIe requires operating system support. That is, multicasting in a conventional PCIe environment requires the operating system to enable the setup of multicast control registers and to define one multicast memory region within the system address map. Further, PCIe multicast functionality does not cope well with untranslated addresses in a virtualized environment except to block them. PCIe requires that multicast transaction be sent in translated address space (i.e. HPA space) only. Additionally, conventional PCIe multicast requires PCIe Multicast capability support in Root Ports in addition to Switch ports to multicast across Root Ports inside a root complex. Therefore, the ability to multicast in a switch downstream of the root ports would enable multiple endpoint devices to multicast to each other without requiring operating system support.

BRIEF DESCRIPTION OF THE DRAWINGS

The invention may best be understood by referring to the following description and accompanying drawings that are used to illustrate embodiments of the invention.

DETAILED DESCRIPTION

Figure 1:
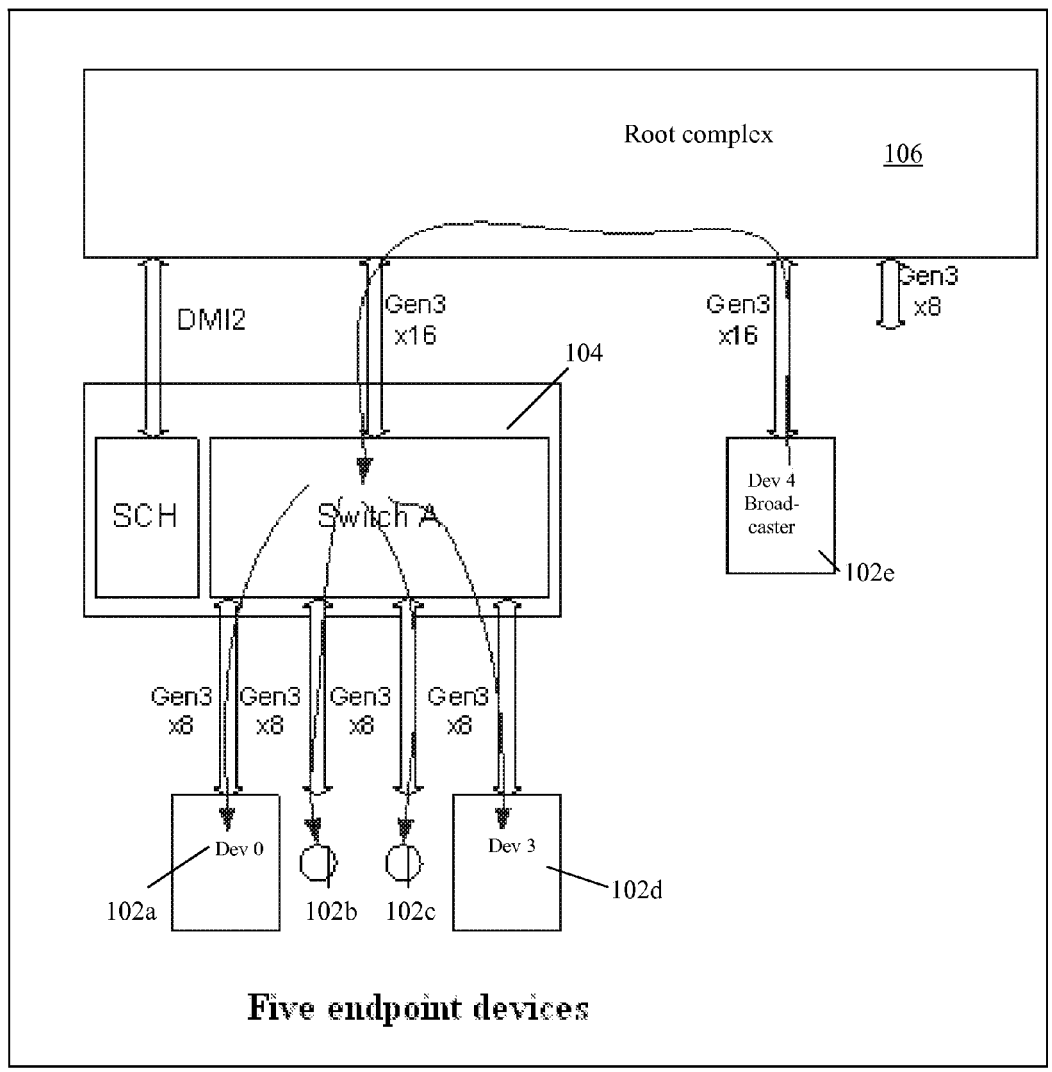
FIG. 1 is a schematic illustration of an embodiment with five graphics devices and a single switch.

As used in the specification and claims, the singular forms "a", "an" and "the" include plural references unless the context clearly dictates otherwise. A "protocol" is a set of rules governing the format, syntax and order, of messages that are exchanged between at least two subsystems. A "root complex" ("RC") is a PCI Express device that connects a processor (or central processing unit (CPU)) and memory to the PCI Express switch fabric. The root complex generates transaction requests on behalf of the processor. An "endpoint" device refers to a hardware device that lies at one end of a data path that originates or terminates at an application program. Example endpoint devices include, but are not limited to, graphics cards (graphic processing units (GPU), storage devices, disk drives, servers, clients, modems, speakers, headphones, microphones, and CD players.

"Virtualization" is the method by which a guest operating system is run under another host operating system with littler or no modification of the guest operating system. Virtualization for devices technology (VT-d) is Intel's technology for virtualization on the x86 platform. A guest physical address (GPA) refers to a virtual machines physical address space. A host physical addresses (HPA) refers to the physical address space of the host. An "overlay network" is a net work built on top of one or more existing networks. Overlay networks can be implemented with virtualization.

A "phantom register" is a register in a switch which can be programmed with the device driver of an endpoint device. The phantom registers allow an Endpoint driver to gain control of certain registers of other devices by bypassing the operating system's security. Phantom registers are registers that appear logically in one device but actually reside in another device.

"Multicast" is a network addressing method for the delivery of information to a group of destinations. Preferably, the information is delivered to each link of the network only once, creating copies only when the links to the multiple destinations split. Multicast uses network infrastructure efficiently by having the source send a packet only once, even if the packet is to be delivered to a large number of receivers. The nodes in the network take care of replicating the packet to reach multiple receivers only when necessary.

An "upstream" transaction is a transaction that traverses toward a root complex. A "downstream" transaction is a transaction that traverses away from a root complex.

Embodiments of the present invention are related to systems and methods implementing multicast capability. The systems and method use a switch that allows multiple PCIe endpoint devices to multicast to each other. Example endpoint devices include, but are not limited to, graphics cards (graphic processing units (GPU), modems, speakers, headphones, microphones, and CD players.

Phantom register support is a new method that allows endpoint device drivers to program the multicast registers inside a switch. To circumvent the operating system restriction that prevents device drivers from programming registers in the switch, a range of the endpoint device's configuration space can be intercepted by the switch. The intercepted accesses can then be re-routed to ultimately target a different device's configuration space. In this embodiment, the intercepted configuration accesses are never received by the targeted device. In an alternative embodiment, configuration accesses targeting an endpoint can be re-routed to ultimately target a switch port or another endpoint device. In still another embodiment, a configuration request targeting the switch port can be re-routed to ultimately target an endpoint or another switch port.

Figure 2:
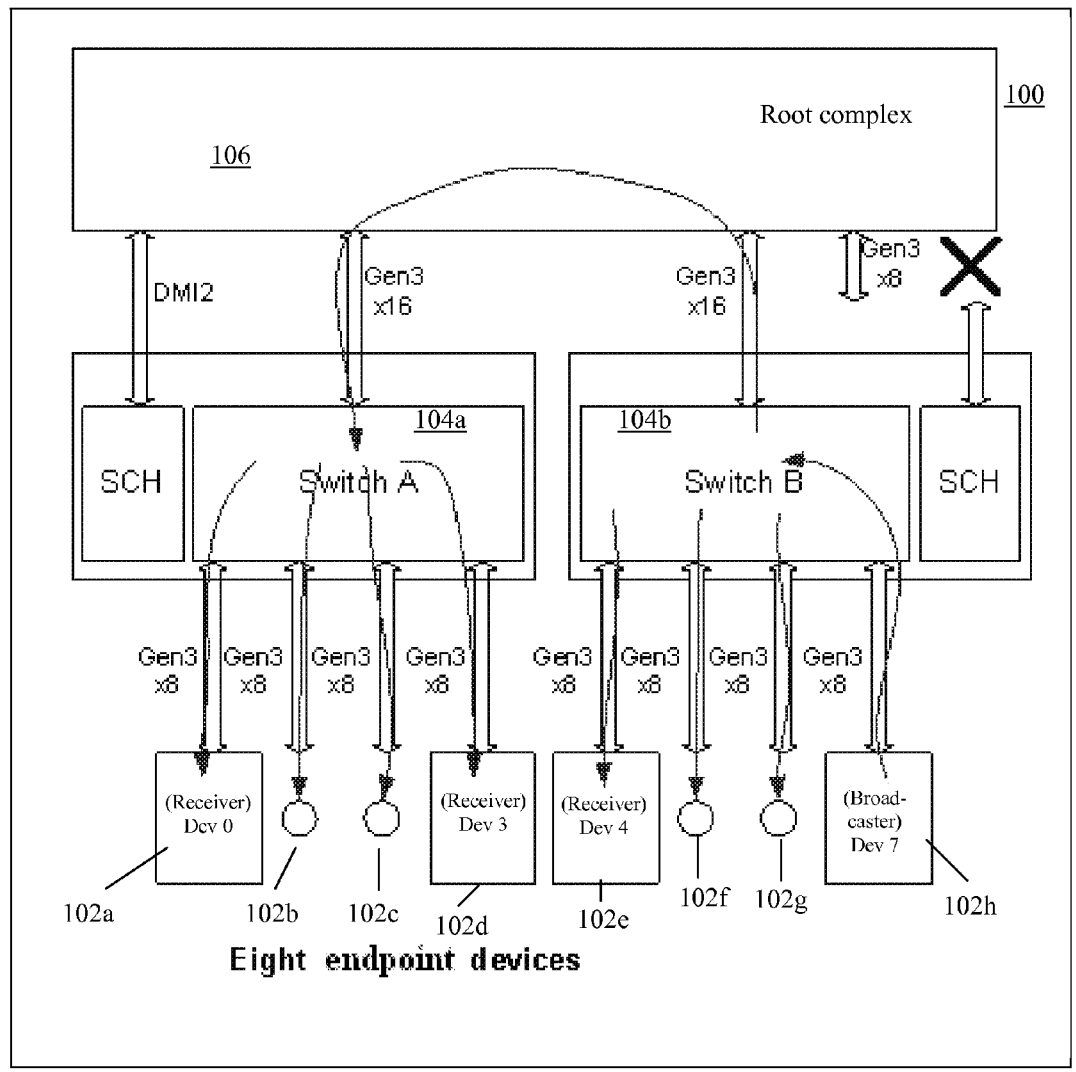
FIG. 2 is a schematic illustration of an embodiment with eight graphics devices and two switches.

FIGS. 1 and 2 illustrate embodiments of multicasting systems. The system 100 illustrated in FIG. 1 includes five PCIe endpoint devices 102a, 102b, 102c, 102d, 102e. One (e.g., 102e) of the PCIe endpoint devices 102a, 102b, 102c, 102d, 102e is a broadcaster (producer) endpoint device. In this embodiment, the broadcaster endpoint device 102e is the sender. That is, broadcaster endpoint device 102e is the originator of the data to be multicast. The other four endpoint devices are receiver (consumer) endpoint devices 102a, 102b, 102c, 102d. In this embodiment, the receiver endpoint devices 102a, 102b, 102c, 102d are receivers. That is, receiver endpoint devices 102a, 102b, 102c, 102d receive the data sent by broadcaster endpoint device 102e. The systems 100 also includes a switch 104 and a root complex 106. As illustrated, the four receiver endpoint devices 102a, 102b, 102c, 102d are operably attached to the switch 104 while the broadcaster endpoint device 102e is operably attached to the root complex 106. In other aspects of this embodiment, the broadcaster endpoint device 102e may be operably attached to the switch 104 and/or some or all of the receiver endpoint devices 102a, 102b, 102c, 102d attached to the root complex 106.

FIG. 2 illustrates another embodiment of the invention. The system 100 of this embodiment includes eight PCIe endpoint devices 102a, 102b, 102c, 102d, 102e, 102f, 102g, 102h and two switches 104a, 104b. As illustrated, each switch 104a, 104b has four of the endpoint devices 102a, 102b, 102c, 102d, 102e, 102f, 102g, 102h attached to it. The use of two switches and four endpoint devices per switch is consistent with the current PCIe standard. The switch 104 of the present invention, however, is not limited to the current PCIe standard. That is, there is no theoretical limitation to the number of switches and number of endpoint devices per switch that could be used.

In the embodiment illustrated in FIG. 2, one (e.g., 102h) of the PCIe endpoint devices 102a, 102b, 102c, 102d, 102e, 102f, 102g, 102h is a broadcaster endpoint device. As in the last embodiment, the broadcaster endpoint device 102h of this embodiment is the sender. The other seven endpoint devices are receiver endpoint devices 102a, 102b, 102c, 102d, 102e, 102f, 102g—that is, receivers. In this embodiment, the system 100 the first switch 104a and the second switch 104b are connected to the root complex 106. As illustrated, the broadcaster endpoint device 102h and three of the receiver endpoint devices 102e, 102f, 102g are operably attached to the second switch 104b while four of the receiver endpoint devices 102a, 102b, 102c, 102d are operably attached to the first switch 104a.

The switch 104, 104a, 104b preferably includes two components to support multicast. The first component comprises a phantom register programming model which allows a device driver to program multicast registers in the switch 104. The second comprises overlay support which allows the use of multicast in a virtual environment.

Preferably, the switch 104 supports the PCI Express defined multicast capability. As discuss above, however, the switch 104 need not be limited to the current PCIe standard. Preferably, the switch 104 supports the PCIe Multicast mechanism. Further, the switch 104 preferably incorporates the PCI Express defined Multicast Capability with two additional features: (1) Independent Multicast Base Address Register (MCBAR) programmability and (2) an enhanced address overlay support to re-align multicast memory regions to a new page boundary. The enhanced overlay support allows a multicast region greater than 4K to be re-aligned or shifted to a new 4K page boundary.

Independent MCBAR programming can be used to allow multicast transactions received at each ingress port in the switch 104 to be independently identified. In this manner, a different multicast address region can be provided for each ingress port in order to support a more flexible multicast usage model. Further, a usage model enabled by Independent MCBAR programming allows the multicast capability to function as a simple Intel Virtualization for Devices Technology (VT-d) address translator. In one aspect, a Multicast Address Overlay is leveraged to support address translation from Guest Physical Address (GPA) to Host Physical Address (HPA) when multicasting and VT-d Technology is enabled.

Figure 3:
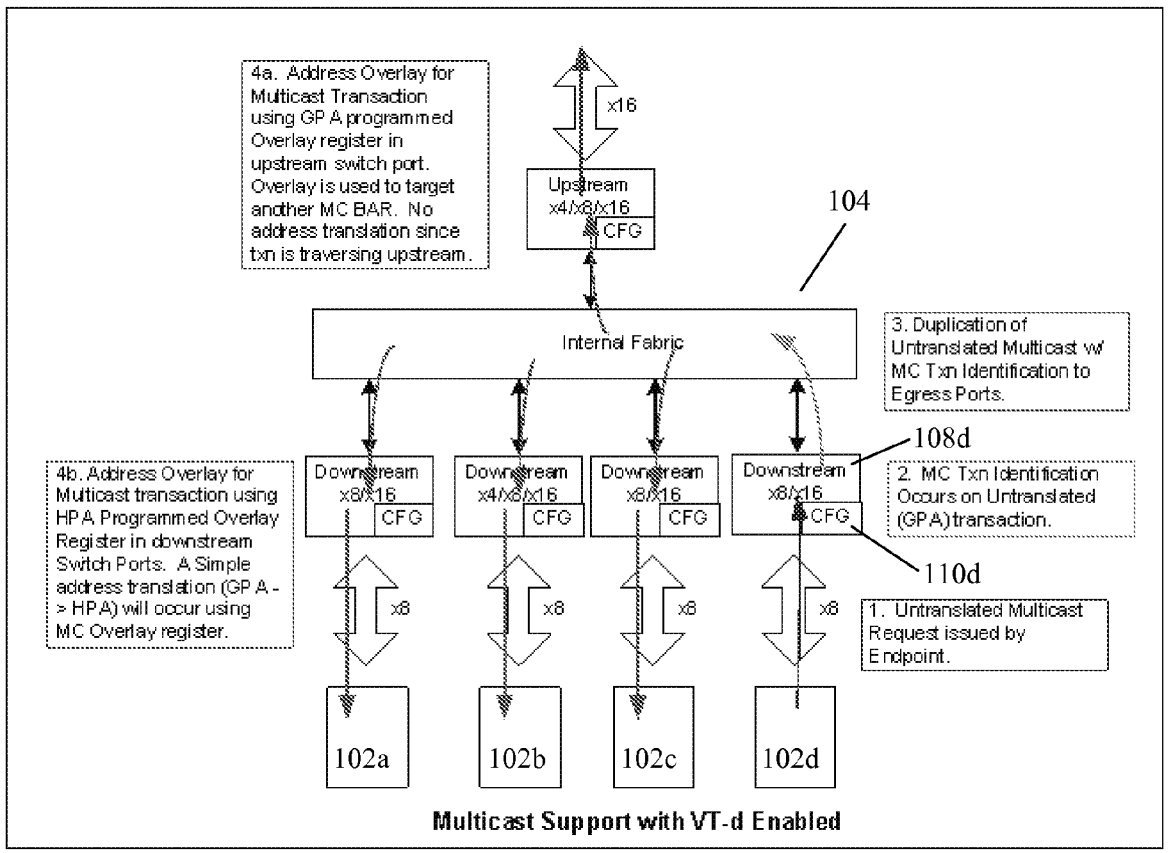
FIG. 3 is a schematic diagram illustrating an embodiment of multicasting untranslated transactions.

FIG. 3 illustrates an embodiment of a method of multicasting. First, an untranslated multicast request is issued by the broadcaster endpoint device 102d (box 1). Because the transaction is traversing upstream from the broadcaster endpoint 102d, it traverses as an untranslated GPA space request. In the switch 104, the transaction is identified as an untranslated GPA request (box 2). The switch identifies which ports 108a, 108b, 108c should receive a copy of the multicast request packet and the duplicates the request packet for each identified port, appending the port address to the multicast packet (box 3). To reach ports (not shown) that are not attached to the same switch 104 as the broadcaster endpoint device 102d (e.g., endpoint devices attached to another switch 104 or directly to a root port, collectively 'remote endpoint devices), the multicast transaction is forwarded to an upstream port 112 (box 4a). An address overlay is used to target another MCBAR associated with the remote endpoint devices. There is no address translation because the multicast transaction is traveling upstream To reach the downstream ports 108a, 108b, 108c, an address overlay translates the multicast transaction from GPA to HPA in an HPA programmed overlay register in the downstream switch ports 108a, 108b, 108c (box 4b).

That is, in the method illustrated in FIG. 3, transactions traversing upstream from the broadcaster endpoint 102d traverse as untranslated GPA space requests. Transactions traversing downstream, traverse as translated HPA space requests when VT-d is enabled. Typically, the translation from the GPA space request to the HPA space request is accomplished by programming the MCBAR registers with GPA values and the address overlay register with HPA values for downstream ports. The address overlay logic translates the multicast request before forwarding the transaction downstream. No address translation is required before sending the request upstream on the upstream switch port.

Enhanced overlay support is a feature that allows a multicast region greater than a predetermined amount to be re-aligned or shifted to a new page boundary. Overlay support increases flexibility when supporting a simple GPA-to-HPA address translation in a VT-d enabled system. In one aspect, the multicast region has a size of 4K. In other aspects, the multicast region has a size less than 4K. In still other aspects, the multicast region has a size greater than 4K.

In one embodiment, enhanced Overlay Support may be defined as:

---

If (MC_Overlay_Size < 6 or 64 Bytes)
   Egress TLP address = Ingress TLP address
Else if ((MC_Overlay_Size > 12 or 4K Bytes) & (Enhanced Support == 1b))
   Egress TLP address = {MC_Overlay_BAR[63:12] + Ingress TLP address[MC_Overlay_Size-1:12], Ingress TLP Address [11:0]}
Else
   Egress TLP address = {MC_Overlay_BAR[63:MC_Overlay_Size], Ingress TLP Address [MC_Overlay_Size-1:0]}

---

Figure 4:
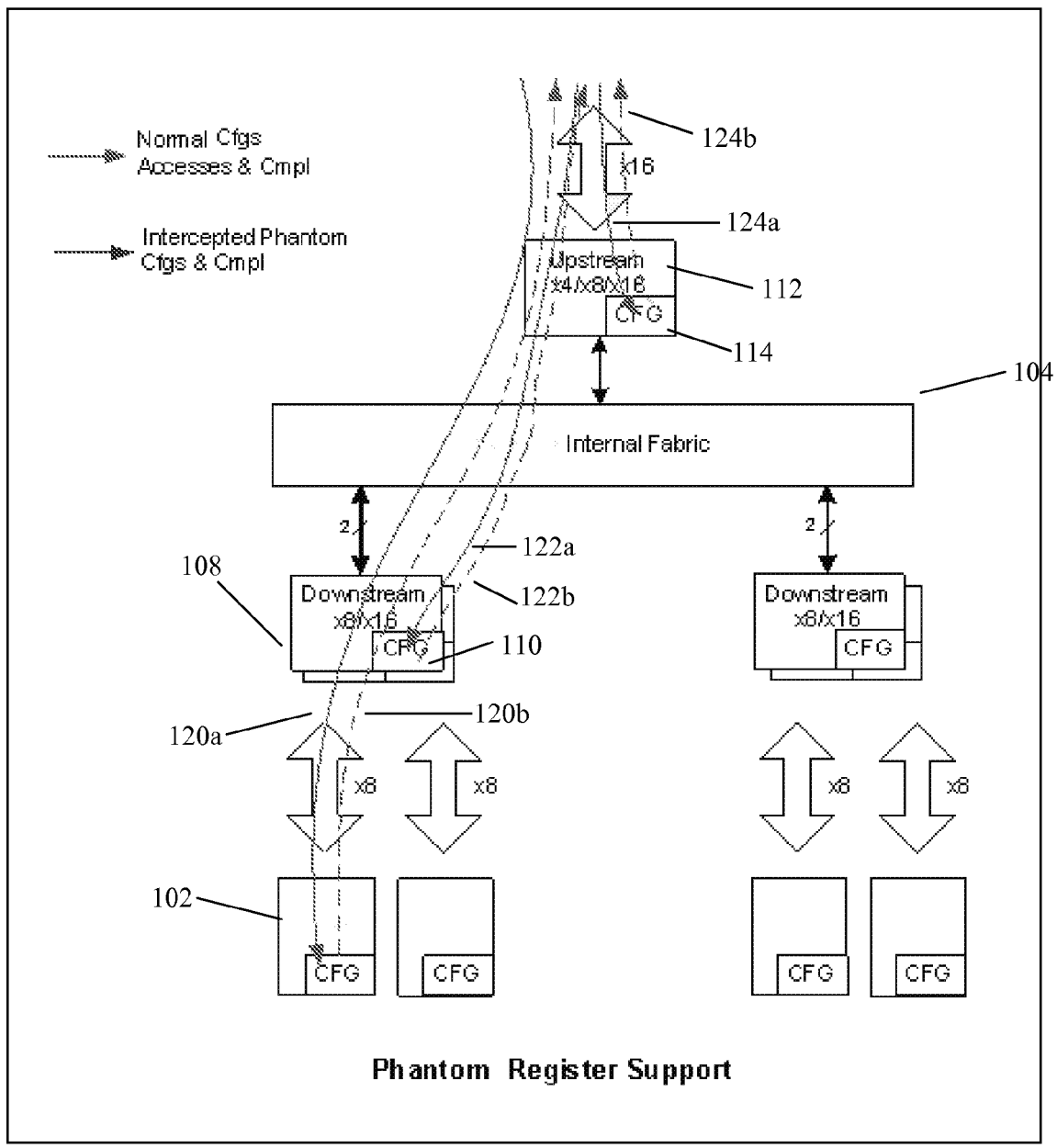
FIG. 4 is a schematic diagram illustrating the interception of configuration requests of a graphics device by a switch.

As discussed above, phantom register support is a new method that allows endpoint device drivers to program the multicast registers inside the switch 104. The use of phantom registers to intercept and service configuration requests is illustrated in FIG. 4. When enabled, phantom register support allows device driver software to setup and support multicasting transactions without operating system support or knowledge. A normal (conventional) request and completion is illustrated with lines 120a and 120b, respectively. The normal request travels from the root complex (not shown) through the upstream port 112 of the switch 104, through the downstream port 108 to the endpoint device 102. The endpoint device 102 processes the request 120a and then sends a completion 102b back to the root complex. The normal completion 120 goes from the endpoint device 102a through the downstream port 108a of the switch 104, through the upstream port 110 back to the root complex (via a root port not shown).

The use of phantom registers to intercept requests can be performed in either the configuration registers 110 of the downstream port 108 or in the configuration registers 114 in of the upstream port 112. The use of configuration registers 110 of the downstream port 108 is illustrated with lines 122a and 122b for the request 122a and the completion 122b, respectively. The request 122a travels from the root complex through the upstream port 112 of the switch 104, to the downstream port 108. Hardware in the switch 104 recognizes the request and diverts it to the configuration registers 110 of downstream port 108. The request 122a is trapped and forwarded in the configuration registers 110 of the downstream port 108 where it is serviced. The completion 122b is sent from configuration registers 110 of the downstream port 108 through the upstream port 112 back to the root complex.

The use of configuration registers 114 of the upstream port 112 is illustrated with lines 124a and 124b. The request 124a travels from the root complex to the upstream port 112 of the switch 104. Hardware in the switch 104 recognizes the request and diverts it to the configuration registers 114 of upstream port 112. Similarly to the prior embodiment, the request 124a is trapped and forwarded to the configuration registers 114 of the upstream port 112 where it is serviced. The completion 124b is sent from the configuration registers 114 of the upstream port 112 back to the root complex.

Figure 5:
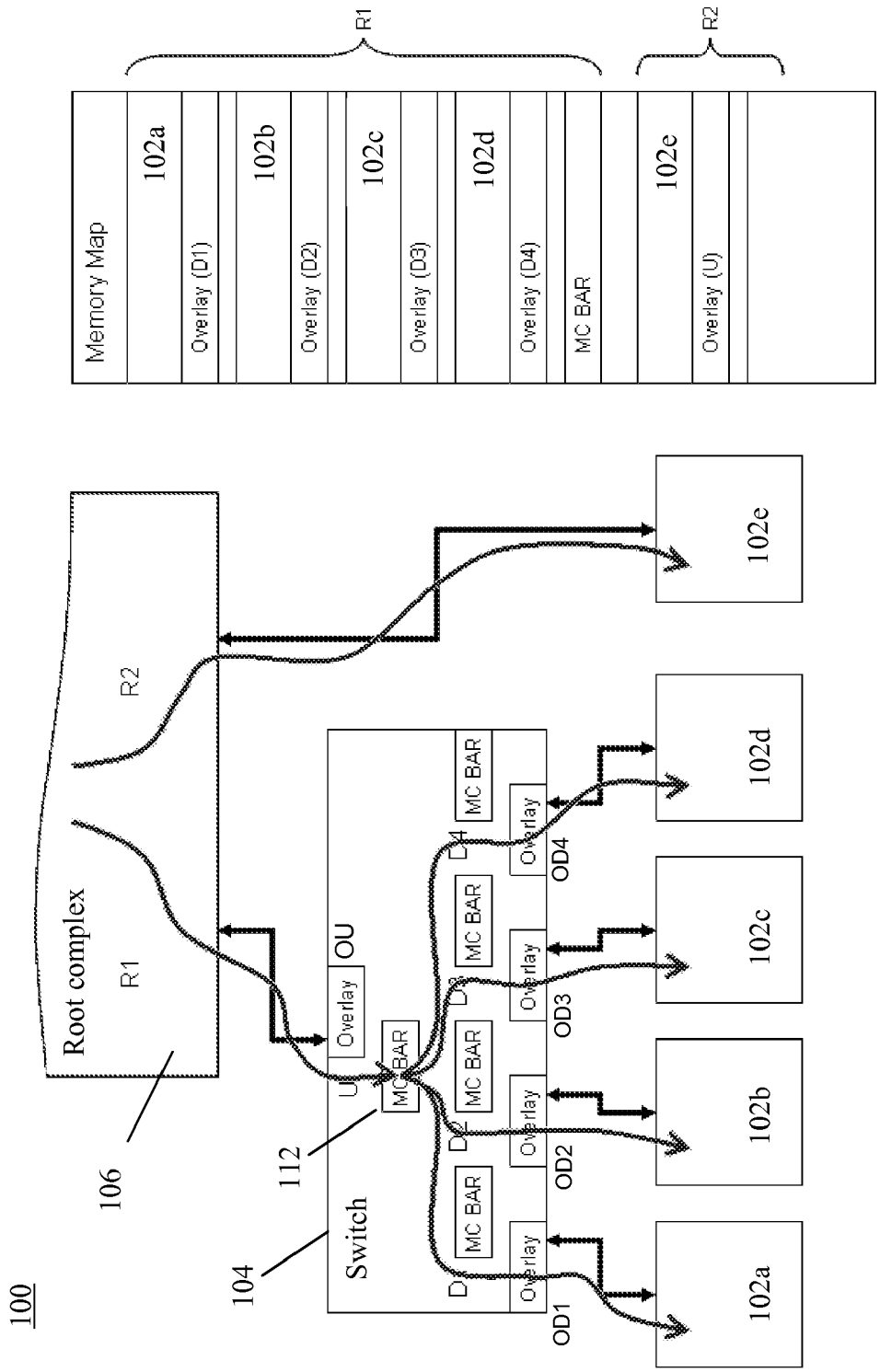
FIG. 5 is a schematic diagram illustrating an embodiment of multicast support via the host.
Figure 6:
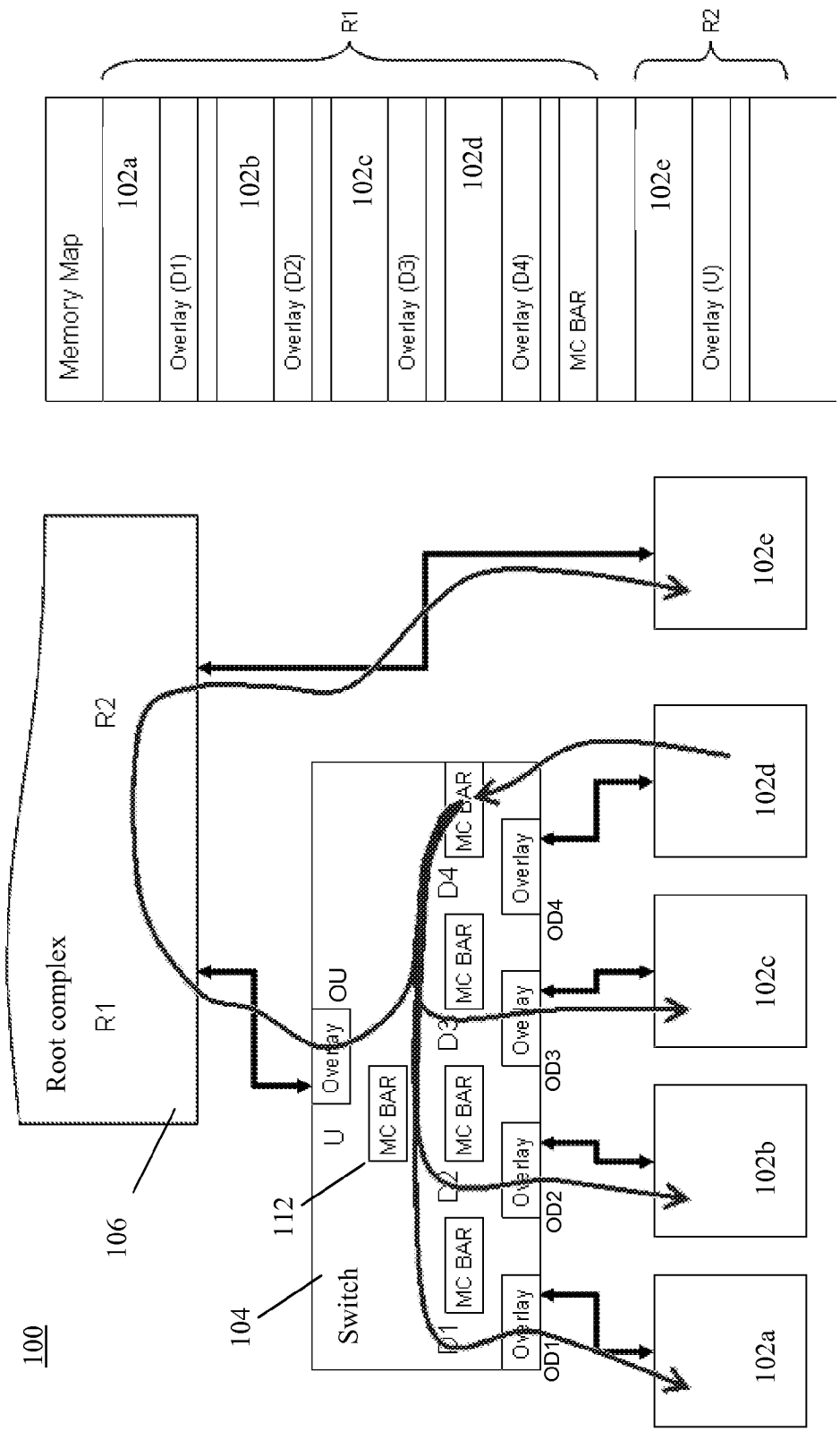
FIG. 6 is a schematic diagram illustrating an embodiment of multicast support via the switch.
Figure 7:
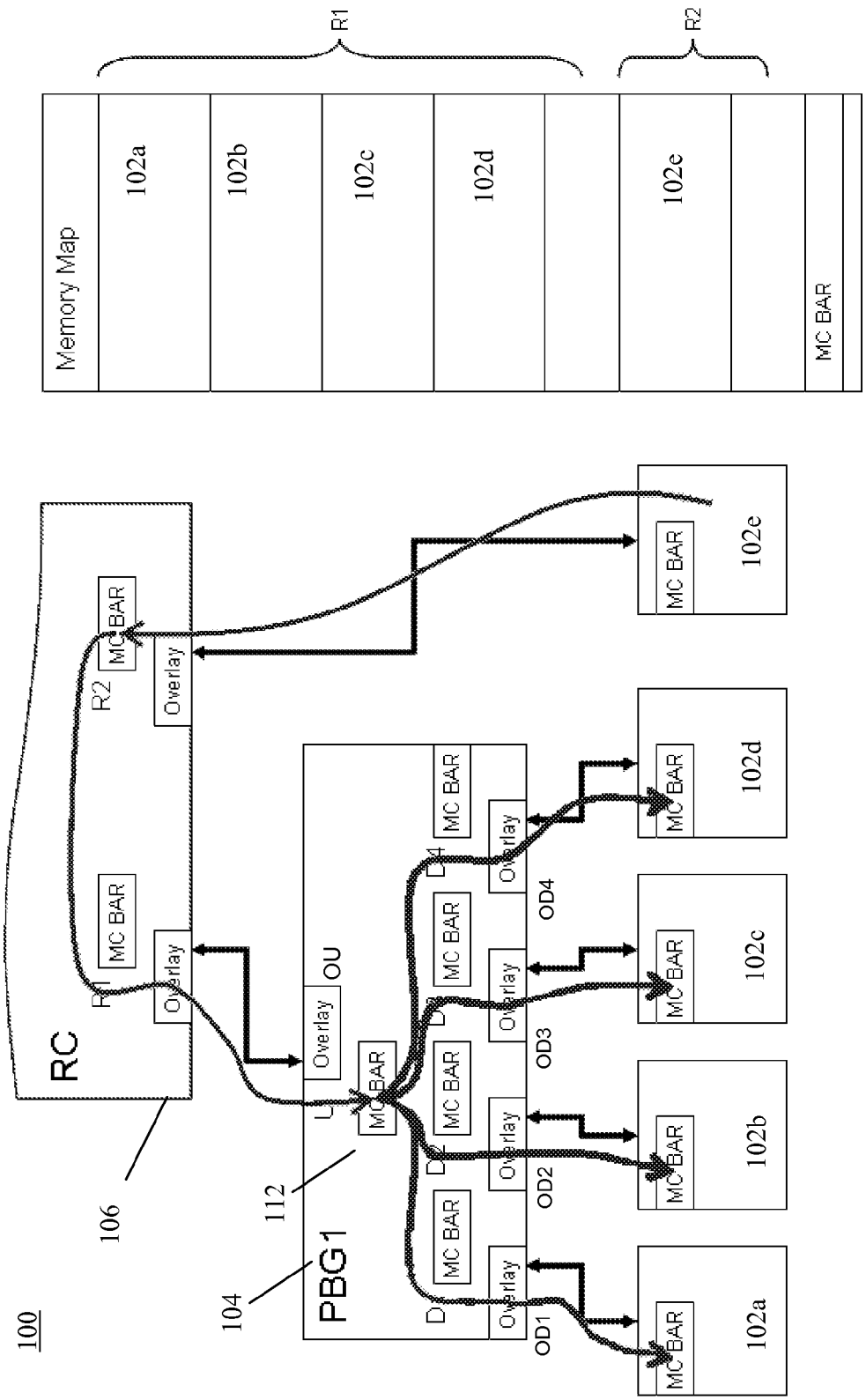
FIG. 7 is a schematic diagram illustrating an embodiment of multicast support via the root port.
Figure 8:
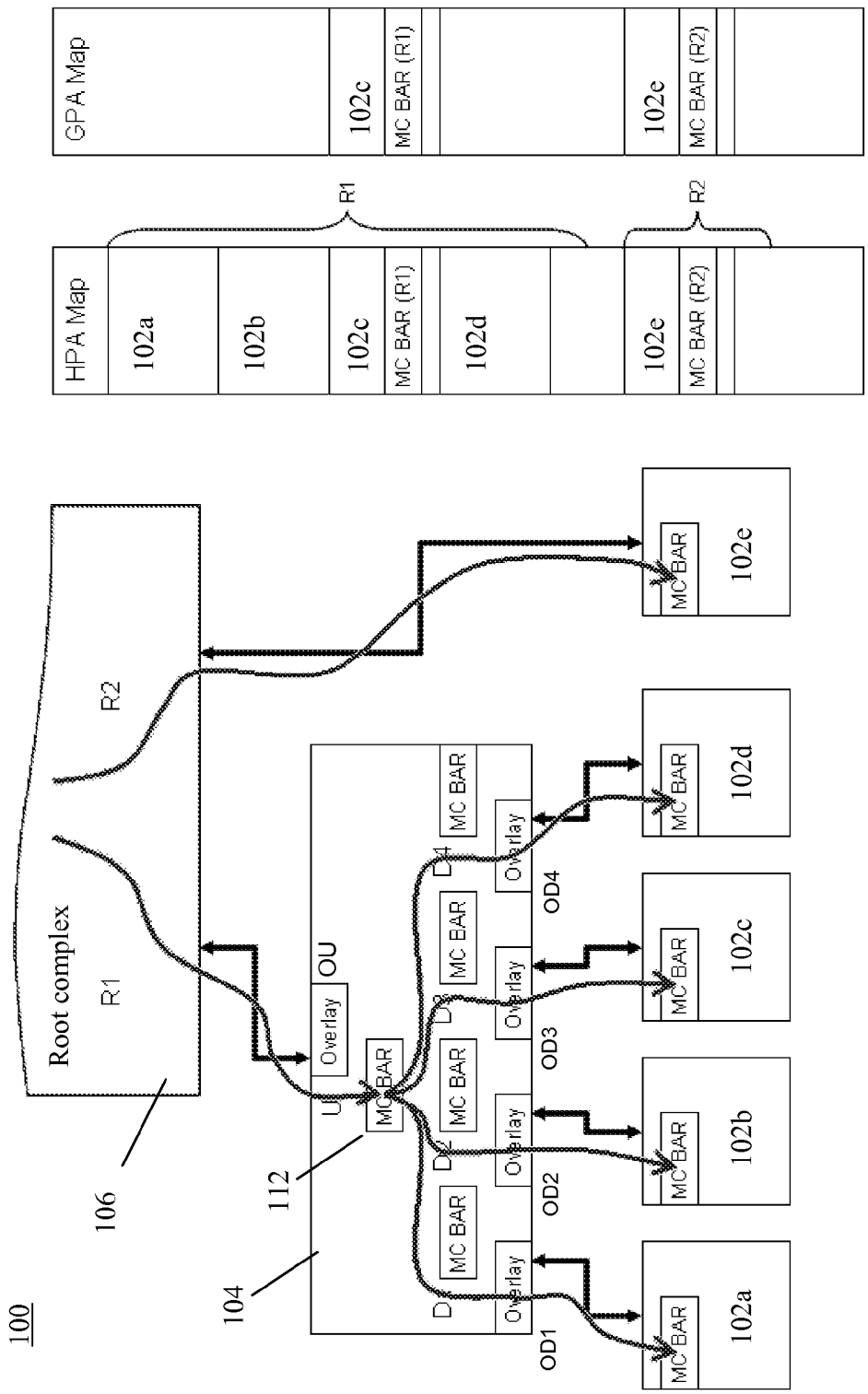
FIG. 8 is a schematic diagram illustrating an embodiment of multicast support with virtualization via the host.
Figure 9:
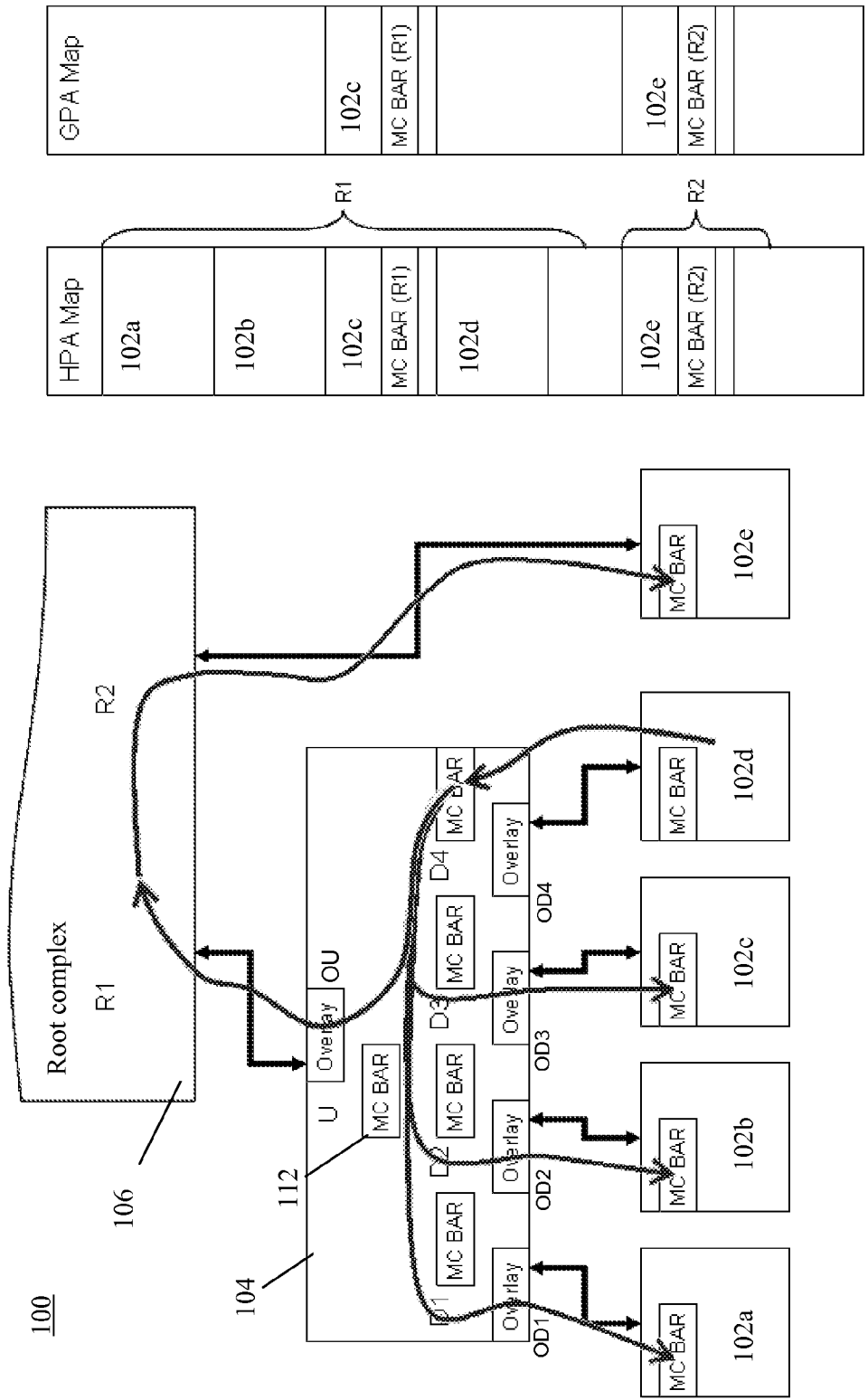
FIG. 9 is a schematic diagram illustrating an embodiment of multicast support with virtualization via the switch.
Figure 10:
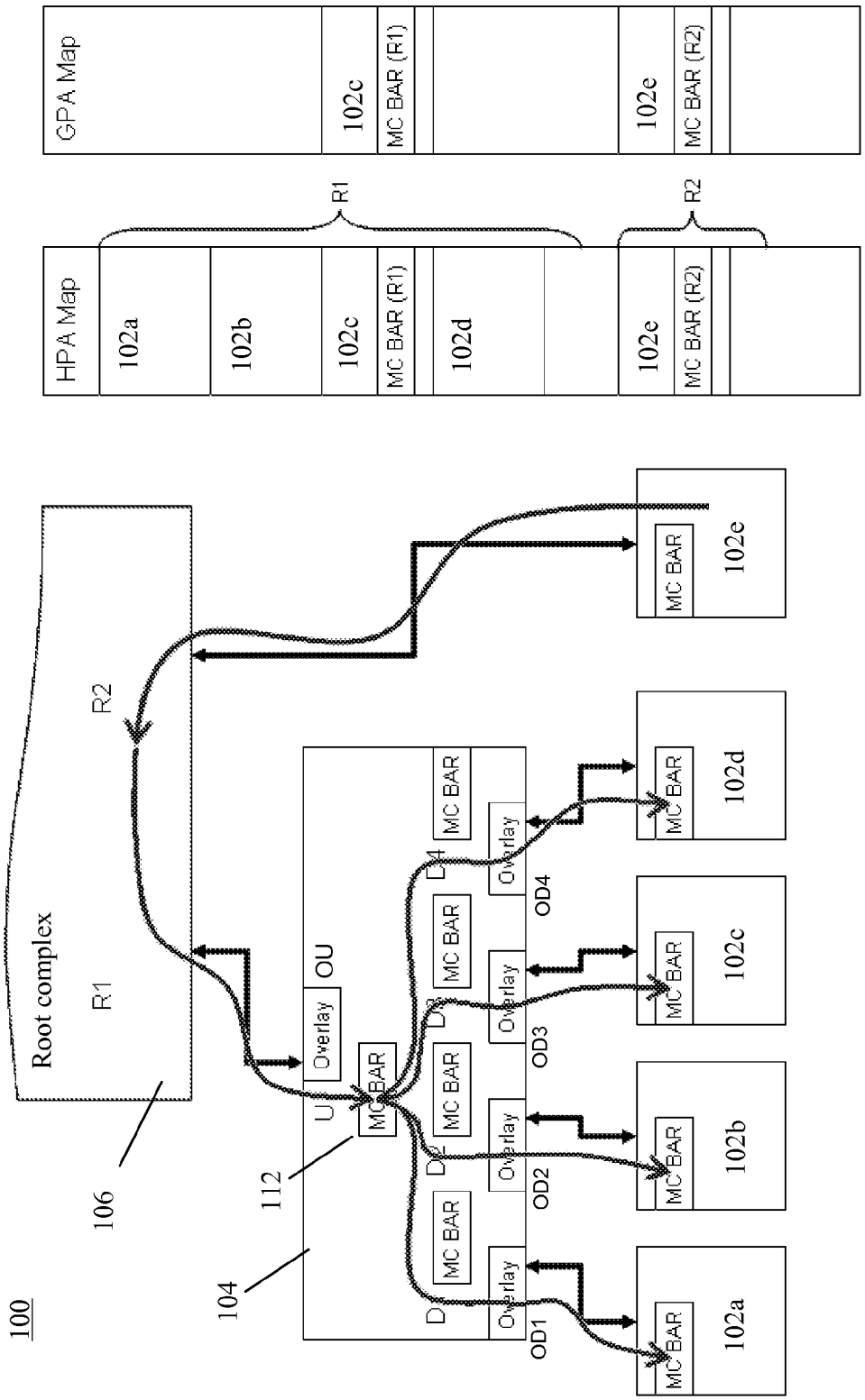
FIG. 10 is a schematic diagram illustrating an embodiment of multicast support with virtualization via the root port.

FIGS. 5-10 illustrate various different embodiments of the invention. FIGS. 5-7 illustrate multicast support via the host, a switch, or a root port without virtualization. FIGS. 8-10 illustrate multicast support via the host, a switch, or a root port with virtualization.

FIG. 5 is a schematic diagram illustrating an embodiment of multicast support via the host in a system 100 that otherwise does not support multicasting. In this embodiment, the system 100 includes a root complex 106 with two root ports R1, R2. Also included is a switch 104 and five endpoint devices 102a, 102b, 102c, 102d, and 102e. The switch 104 is attached to the first root port R1. In this embodiment, four of the endpoint devices 102a, 102b, 102c, and 102d, are attached to the switch 104. The fifth endpoint device 102e is attached to the second root port R2. In this embodiment, a multicast request starts from the root complex and is sent to all five endpoint devices 102a, 102b, 102c, 102d, and 102e. Because endpoint device 102e is directly attached to the root complex 106 via the second root port R2, the request to endpoint device 102e can be directly sent from the root complex 106 to endpoint device 102e. That is, a switch 104 is not needed to send a multicast request to endpoint device 102e.

Because the system 100 does not support multicasting, to reach the first four endpoint devices 102a, 102b, 102c, 102d, the request must first be sent to the switch 104. The request is trapped in the upstream port 112 of the switch 104. The upstream port 112 of the switch 104 forwards the request to the first four endpoint devices 102a, 102b, 102c, 102d via downstream port overlays OD1, OD2, OD3, OD4. In this manner, the host is able to multicast the request to all five endpoint devices 102a, 102b, 102c, 102d, 105e.

FIG. 6 is a schematic diagram illustrating an embodiment of multicast support via the switch. The system 100 is exactly the same as that illustrated in FIG. 5. In this embodiment, however, the request is being sent from the fourth endpoint device 102d. In this embodiment, the request is trapped by the downstream port D4 associated with the fourth endpoint device 102d. The downstream port D4 copies and forwards the request to the other three endpoint devices 102a, 102b, 102c attached to the switch 104 using new addresses derived from overlay values OD1, OD2, OD3. To reach the fifth endpoint device 102e, the downstream port D4 forwards the request to the upstream ort U using the new address derived from the overlay OU associated with the upstream port. The request sent to the fifth endpoint 102e via the second root port R2.

FIG. 7 is a schematic diagram illustrating an embodiment of multicast support via the root port. The system 100 is the same as that illustrated in FIG. 5. In this embodiment, however, the request is being sent from the fifth endpoint device 102e. In this embodiment, the request is sent to the root complex 106 via the second root port R2. The request passes to the switch 104 via the first root port R1. The request is trapped in the upstream port of the switch 104. The upstream port forwards the request to the four endpoint devices 102a, 102b, 102c, 102d attached to the switch 104 via the downstream port using new addresses derived from overlay values OD1, OD2, OD3, OD4.

FIG. 8 is a schematic diagram illustrating an embodiment of multicast support with virtualization via the host. In this embodiment, the system 100 includes five endpoint devices 102a, 102b, 102c, 102d, 102e in the same virtualized environment. In this example, the upstream port's MCBAR address is programming using host physical addresses (HPA) and the downstream port's MCBAR addresses are programmed using guest physical addresses (GPA). The HPA are used for downstream requests and the GPA for upstream requests. In this embodiment, the overlay mechanism is active in all of the ports of the switch 104.

In this embodiment, a multicast request starts from the root complex and is sent to all five endpoint devices 102a, 102b, 102c, 102d, and 102e. Because the fifth endpoint device 102e is directly attached to the root complex 106 via the second root port R2, the request to the fifth endpoint device 102e can be directly sent from the root complex 106 to the fifth endpoint device 102*e*. To reach the first four endpoint devices 102*a*, 102*b*, 102*c*, 102*d*, the request must first be sent to the switch 104. The request is trapped in the upstream port of the switch 104. The upstream port of the switch 104 forwards the request to the first four endpoint devices 102*a*, 102*b*, 102*c*, 102*d* using new HPA addresses derived from overlay values. In this manner, the host is able to multicast the request to all five endpoint devices 102*a*, 102*b*, 102*c*, 102*d*, 105*e*.

FIG. 9 is a schematic diagram illustrating an embodiment of multicast support with virtualization via the switch. The system 100 is the same as that illustrated in FIG. 8. In this embodiment, however, the request is being sent from the fourth endpoint device 102*d*. In this embodiment, the request is trapped by the downstream port associated with the fourth endpoint device 102*d*. The downstream port forwards the request to the other three endpoint devices 102*a*, 102*b*, 102*c* attached to the switch 104 using new HPA addresses derived from overlay values OD1, OD2, OD3. The GPA request of the first three endpoint devices 102*a*, 102*b*, 102*c* are translated to HPA values. To reach the fifth endpoint device 102*e*, the downstream port D4 forwards the request to the upstream port U using the new GPA address derived from the overlay OU associated with the upstream port to the root complex. The GPA value of the fifth endpoint 102*e* is translated to an HPA value in the root complex 104. The request is then sent to the fifth endpoint 102*e* via the second root port R2.

FIG. 10 is a schematic diagram illustrating an embodiment of multicast support with virtualization via the root port. The system 100 is the same as that illustrated in FIG. 8. In this embodiment, however, the request is being sent from the fifth endpoint device 102*e*. In this embodiment, the request is sent to the root complex 106 via the second root port R2. The GPA values of the first four endpoint devices 102*a*, 102*b*, 102*c*, 102*d* are translated to HPA values in the root complex 104. The request passes to the switch 104 via the first root port R1. The HPA request is trapped in the upstream port. The upstream port forwards the request to the four endpoint devices 102*a*, 102*b*, 102*c*, 102*d* attached to the switch 104 from overlay values OU1, OU2, OU3, OU4.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

The foregoing detailed description has set forth various embodiments of the devices and/or processes via the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to optical coupling to permit transmission of optical light, for example via an optical pipe or fiber, physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

What is claimed is:

1. A device comprising:
   multicast registers;
   a plurality of ingress ports and
   hardware configured to execute an operating system, multi-base address register (MCBAR) programming program, and phantom register programming program wherein the phantom register programming program allows an endpoint device driver in an endpoint device to interface with the multi-base address register programming program without operating system support which results in each ingress port of the plurality of ingress ports to be assigned a unique multicast address region which results in configuring the each ingress port to independently identify multicast transaction received at the each ingress port.

2. The device of claim 1, wherein the hardware is configured to circumvent a restriction of the operating system, the restriction preventing device drivers from programming registers of another device.

3. The device of claim 1, wherein the endpoint device is at least one of a graphics card, storage device, disk drive, server, client, or modem.

4. The device of claim 1, wherein the phantom register programming allows the endpoint devices to program the multicast registers.

5. The device of claim 1, wherein the hardware is configured to intercept multicast configuration requests from the plurality of endpoint devices or the ingress ports.

6. The device of claim 5, wherein the hardware is configured to re-route the intercepted multicast configuration requests to target multicast registers in an upstream or downstream port.

7. A system comprising:
   a plurality of endpoint devices; and a switch
   wherein said switch includes the following:
   a plurality of registers;
   hardware; and
   a memory which stores an operating system, multi-base address register (MCBAR) programming program, and phantom register programming program executable by said hardware and a device driver which is configured to interface with said plurality of endpoint devices without support from the operating system executed by the hardware in order to configure said plurality of registers to perform as phantom registers wherein said phantom registers to multicast data between said plurality of endpoint devices.

8. The system of claim 7, wherein the phantom register programming allows a device driver to program multicast registers in the switch.

9. The system of claim 7, wherein the switch is configured to translate addresses from guest physical address (GPA) to host physical address (HPA) with virtualization for devices technology (VT-d).

10. The system of claim 7, wherein the system is configured to multicast untranslated transactions upstream of an ingress port.

11. The system of claim 7, wherein the switch is configured to circumvent an operating system restriction that prevents one device driver from programming registers in a different device.

12. The system of claim 7, wherein the phantom register programming allows the endpoint devices to program the multicast registers in the switch.

13. The system of claim 7, wherein the switch is configured to intercept configuration requests from the plurality of endpoint devices.

14. A method comprising:
   Sending a configuration request to a switch by device driver in an endpoint device;
   receiving the configuration request by said switch;
   wherein said configuration request is used to configure multicast register in the switch to perform multicast transactions.

15. The method of claim 14, wherein the configuration request is configured to set up multicasting and the configuration request is sent from a root complex.

16. The method of claim 14, wherein the configuration request is configured to set up multicasting and the configuration request is processed without the support of an operating system.

17. The method of claim 14, wherein the multicast request is not translated in a virtualized environment or system when the multicast request traverses upstream.

18. The method of claim 14, wherein the multicast request is translated in a virtualized environment or system when the multicast request traverses downstream.

19. The method of claim 18, wherein the multicast request uses guest physical addresses (GPA) when the multicast request traverses upstream in a virtualized environment or system; and the multicast request uses host physical addresses (HPA) when the multicast request traverses downstream in a virtualized environment or system.

20. A device comprising a first switch that has a first plurality of ports, wherein the first switch is configured to allow multicast transactions received at least one of the first plurality of ports to multicast to more than one other port of the first plurality of ports; wherein each port of the first plurality of ports has a unique multicast address region.

21. The device of claim 20, wherein the first switch is configured to allow a device operatively connected through at least one of the first plurality of ports to program the multicast address regions of the first plurality of ports.

22. The device of claim 20, wherein the first plurality of endpoint devices are selected from the group consisting of a graphics card, storage device, disk drive, server, client and modem.

23. The device of claim 20, wherein the first switch is configured to intercept a multicast configuration request targeting at least one port of the first plurality of ports such that the multicast configuration request is never received by the at least one port.

24. The device of claim 23, wherein the first switch is configured to re-route the intercepted multicast configuration request to target another port of the first plurality of ports.

25. The device of claim 23, wherein the first switch is configured to intercept the multicast configuration request by intercepting a range of configuration space of a device operatively attached to the at least one of the first plurality of ports.

26. The device of claim 20, wherein the first switch is configured to translate addresses from guest physical address (GPA) to host physical address (HPA).

27. The device of claim 20, wherein the first switch is configured to re-align or shift the multicast address regions greater than a predetermined amount to a new page boundary.

28. The device of claim 20, further comprising a first plurality of endpoint devices operatively attached to the first switch through the first plurality of ports.

29. The device of claim 28, wherein the first plurality of endpoint devices are PCIe endpoint devices.

30. The device of claim 20, further comprising a root complex operatively attached to the first switch through the first plurality of ports.

31. The device of claim 30, wherein at least one of the first plurality of endpoint devices is operatively attached to the first switch through the root complex.

32. The device of claim 30, further comprising a second switch that comprises a second plurality of ports, the second switch operatively connected to the root complex through the second plurality of ports.

33. The device of claim 32, wherein the second switch is configured to allow multicast transactions received at least one of the second plurality of ports to multicast to more than one other port of the second plurality of ports.

34. The device of claim 32, wherein the first and second switches and the root complex are configured to allow multicast transactions received at least one of the first or second plurality of ports to multicast to more than one other port of the first or second plurality of ports.

35. The device of claim 20, wherein the first plurality of ports consists of up to four ports.

36. A method comprising:
sending a multicast configuration request targeting a device operatively attached to a first port of a switch to a second port of a switch;
intercepting the multicast configuration request in the switch such that the multicast configuration request is never received by the device operatively attached to the first port;
forwarding the intercepted multicast configuration request to a multicast address region of the first port or the second port; and
servicing the multicast configuration request at the multicast address region.

37. The method of claim 36, wherein the multicast configuration request is configured to set up multicasting and the multicast configuration request is sent from a root complex operatively attached to the switch.

38. The method of claim 36, wherein the multicast configuration request is configured to set up multicasting and the multicast configuration request is processed without the support of an operating system.

39. The method of claim 36, wherein the multicast configuration request is an upstream multicast configuration request and is not translated in a virtualized environment or system.

40. The method of claim 36, wherein the multicast configuration request is a downstream multicast configuration request and is translated in a virtualized environment or system.

41. The method of claim 40, wherein the multicast configuration request is an upstream multicast configuration request and uses guest physical addresses (GPA) or wherein the multicast configuration request is a downstream multicast configuration request and uses host physical addresses (HPA) in a virtualized environment or system.

* * * * *